(12) United States Patent
Yasinski

(10) Patent No.: US 9,540,177 B1
(45) Date of Patent: Jan. 10, 2017

(54) CONVEYOR BELT AND MODULES WITH FLIGHTS AT THE HINGE

(71) Applicant: Laitram, L.L.C., Harahan, LA (US)

(72) Inventor: Elena Rose Yasinski, New Orleans, LA (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 14/819,137

(22) Filed: Aug. 5, 2015

(51) Int. Cl.
*B65G 17/08* (2006.01)
*B65G 17/32* (2006.01)

(52) U.S. Cl.
CPC ............... *B65G 17/08* (2013.01); *B65G 17/32* (2013.01)

(58) Field of Classification Search
CPC ...... B65G 17/08; B65G 17/32; B65G 2207/30
USPC .......................................................... 198/853
See application file for complete search history.

(56) References Cited

U.S. PATENT DOCUMENTS

| 3,870,141 | A | | 3/1975 | Lapeyre et al. | |
|---|---|---|---|---|---|
| 4,171,045 | A | * | 10/1979 | Lapeyre | B65G 17/08 198/635 |
| 4,438,838 | A | * | 3/1984 | Hodlewsky | B65G 17/08 198/853 |
| 5,413,211 | A | | 5/1995 | Faulkner | |
| 5,490,591 | A | | 2/1996 | Faulkner | |
| 6,079,543 | A | * | 6/2000 | Palmaer | B65G 17/08 198/445 |
| 6,382,404 | B1 | | 5/2002 | Guldenfels | |
| 6,467,610 | B1 | | 10/2002 | MacLachlan | |
| 6,695,135 | B1 | | 2/2004 | Lapeyre | |
| 7,048,850 | B2 | | 5/2006 | DePaso et al. | |
| 7,111,725 | B2 | * | 9/2006 | Marshall | B65G 17/08 198/850 |
| 7,252,191 | B2 | | 8/2007 | Ozaki et al. | |
| 7,494,006 | B2 | | 2/2009 | Knott et al. | |
| 8,701,871 | B2 | | 4/2014 | Fourney | |

OTHER PUBLICATIONS

Written Opinion of the International Searching Authority, PCT/US2016/041512, mailed Oct. 24, 2016, Korean Intellectual Property Office.

\* cited by examiner

*Primary Examiner* — Gene Crawford
*Assistant Examiner* — Keith R Campbell
(74) *Attorney, Agent, or Firm* — James T. Cronvich

(57) ABSTRACT

A modular conveyor belt constructed of a series of articulating rows of belt modules having flights formed atop laterally consecutive interleaved hinge elements of adjacent belt rows. The flights on leading and trailing rows are aligned when the belt is running flat, but open up for cleaning as their rows articulate about a sprocket.

12 Claims, 4 Drawing Sheets

CONVEYOR BELT AND MODULES WITH FLIGHTS AT THE HINGE

BACKGROUND

The invention relates generally to power-driven conveyors and more particularly to articulated modular conveyor belts with flights at hinge joints between adjacent belt rows.

Flights are used to divide the conveying surface of a conveyor belt into individual product bins or to help push conveyed products up an incline. Articulated modular conveyor belts are constructed of a series of rows of belt modules pivotally linked together at hinge joints. Typical flight modules have flights that extend upward from the module's conveying surface across the entire width of the module at a position between the hinge joints. In a belt row constructed of two or more flight modules side by side, seams are formed between laterally consecutive flights. These small seams, which can harbor bacteria, are hard to clean. Unlike the hinges, which are often designed to open up and reveal more of the hinge rod for cleaning as they articulate about sprockets, the flights in a belt row remain in alignment and do not open to allow access to the seams by cleaning sprays.

SUMMARY

One version of a modular conveyor belt embodying features of the invention comprises a series of rows of one or more belt modules. Each row has a top side and extends in a direction of belt travel from a trailing end to a leading end and laterally from a left side to a right side. Each row has one or more hinge elements at the trailing end and one or more hinge elements at the leading end. The hinge elements at the trailing end of a row are interleaved and hingedly joined with the hinge elements at the leading end of an adjacent row. At least some of the adjacent rows have flights extending upward from laterally consecutive interleaved hinge elements.

In another aspect of the invention, one version of a conveyor belt module embodying features of the invention comprises an intermediate portion that has a top side and that extends in a direction of travel from a first end to a second end and laterally in width. One or more first hinge elements extend outward from a portion of the first end of the intermediate portion and define one or more spaces at the first end laterally adjacent to the one or more first hinge elements, and one or more second hinge elements extend outward from a portion of the second end of the intermediate portion and define one or more spaces at the second end laterally adjacent to the one or more second hinge elements. The first hinge elements are laterally offset from the second hinge elements. One or more flights extend upward from the one or more first hinge elements. Each flight extends upward from an individual first hinge element without spanning any of the spaces along the first end.

Another version of a conveyor belt module comprises an intermediate portion that has a top side and that extends in a direction of travel from a first end to a second end and laterally in width. First hinge elements are laterally spaced apart along the first end, and second hinge elements are laterally spaced apart along the second end. The first hinge elements are laterally offset from the second hinge elements. Flights extend upward from the plurality of first hinge elements.

DETAILED DESCRIPTION

Figure 1:
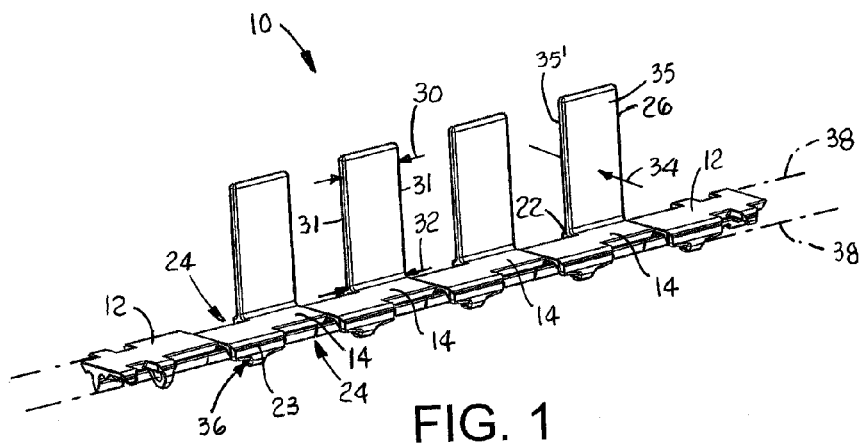
FIG. 1 is an axonometric view of one row of a conveyor belt embodying features of the invention.
Figure 2:
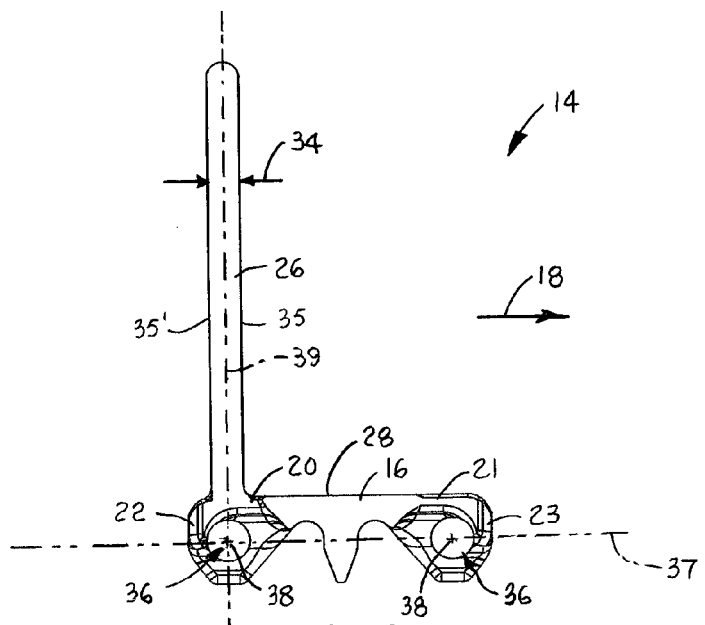
FIG. 2 is a side elevation view of a belt module used to construct the belt row of FIG. 1.

One row of a modular conveyor belt embodying features of the invention is shown in FIG. 1. The belt row 10 shown comprises six belt modules: two edge modules 12 and four interior flight modules 14. As also shown in FIG. 2, each flight module 14 has an intermediate portion 16 that extends in a direction of belt travel 18 from a first end 20 to a second end 21. The flight module 14 has a single hinge element 22 at the first end 20 and a single hinge element 23 at the second end. The hinge elements 22, 23 are elongated laterally along a portion of the width of the module 14 leaving spaces 24 along each end 20, 21 of the belt row 10 between consecutive hinge elements across the width of the row. The hinge elements 22 along the first end 20 are laterally offset from the hinge elements 23 along the second end 21. And the spaces 24 are sized to receive the hinge elements 22, 23 of an adjacent row.

The belt module 14 shown in FIGS. 1 and 2 has a flight 26 extending upward from the hinge element 22 at the first end 20. The flight 26 is shown in this example to be a flat plate perpendicular to the module's top side 28, which extends over the hinge elements 22, 23 from the intermediate portion 16. The lateral dimension 30 of the flight 26 between opposite side faces 31 in this example equals the width 32 of the hinge element 22 from which it extends. And the lateral dimension 30 is greater than the dimension 34 of the flight 26 between front and rear faces 35, 35' in the direction of belt travel 18, i.e., the flight's thickness. Rod holes 36 extend laterally through the hinge elements 22, 23 to receive hinge rods and define lateral articulation, or pivot, axes 38. In this example, the centerline 39 of the flight intersects the pivot axis 38. The plane 37 containing the pivot axes 38 at both ends 20, 21 of a belt module is defined as the plane 37 of the conveyor belt module. The centerline 39 of the plate flight 26 is perpendicular to the plane 37 of the conveyor belt module.

Figure 3:
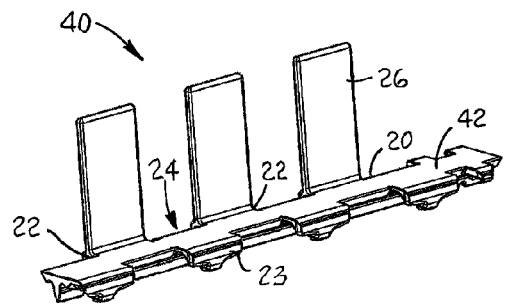
FIG. 3 is an axonometric view of a wide belt module usable in a belt row as in FIG. 1.

Unlike the flight modules 14 shown in FIGS. 1 and 2, the flight module 40 of FIG. 3 has more than one hinge element 22, 23 along each end. The flight module 40 is also shown with an edge portion 42 similar to the edge module 12 of FIG. 1. The flight module 40 has flights 26 extending upward from the elongated hinge elements 22 along the first end 20. Each flight extends upward from an individual hinge element without spanning any of the spaces 24 between the hinge elements 22. This wider flight module 40 can be combined with other similar flight modules of different widths and with or without edge portions 42 to form a belt row of any desired width and that is suitable for bricklaying with other rows to construct a conveyor belt.

Figure 4:
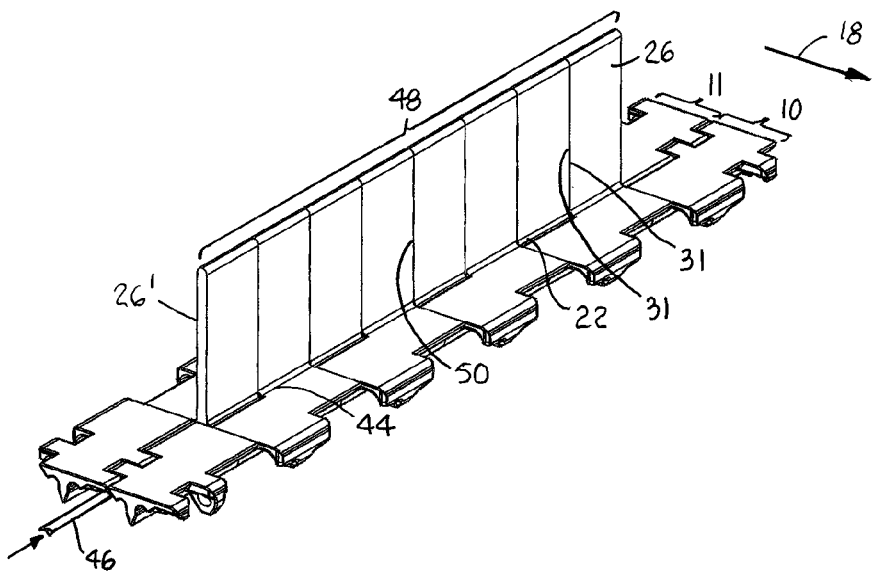
FIG. 4 is an isometric view of two adjacent belt rows including a row as in FIG. 1 used to construct a conveyor belt.
Figure 5:
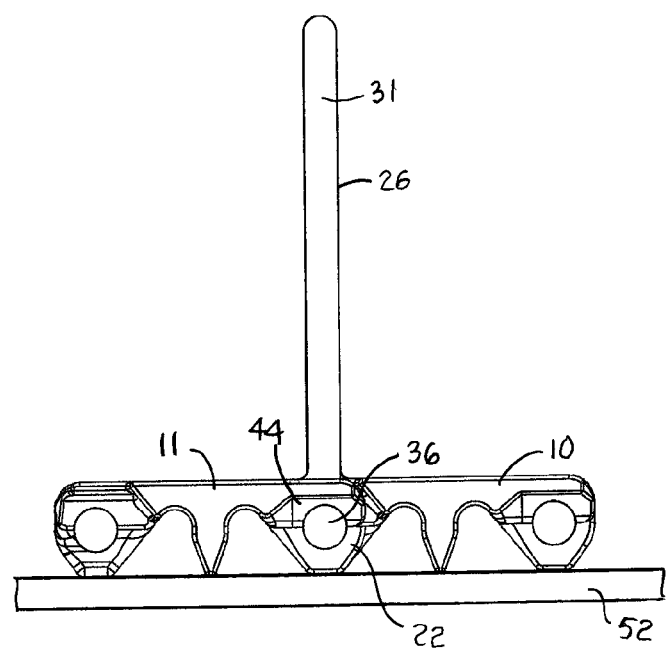
FIG. 5 is a side elevation view of the two belt rows of FIG. 4.

FIG. 4 shows a belt row 10 as in FIG. 1 joined to an adjacent belt row 11, which is identical to the row 10, but reversed end to end. The hinge elements 22 of the leading row 10 and the trailing row 11 are interleaved and form a hinge 44 between the rows. In this example, as also shown in FIG. 5, the rod holes 36 are laterally aligned and accommodate a hinge pin 46 to connect the rows together and allow them to articulate about sprockets. The flights 26, 26' at the hinge 44 extend upward from laterally consecutive interleaved hinge elements 22 of the adjacent belt rows 10, 11 to form an elongated flight 48 that extends across the width of the rows. The elongated flight 48 is broken only by seams, or gaps 50, between consecutive flights 26, 26'. When the belt is running flat on a carryway 52 in the direction of belt travel 18, the flights 26, 26' of both rows 10, 11 are aligned across the width of the belt. The side faces 31 of aligned laterally consecutive flights 26, 26' confront each other across the gap 50, which occludes the side faces and makes cleaning them difficult.

Figure 6:
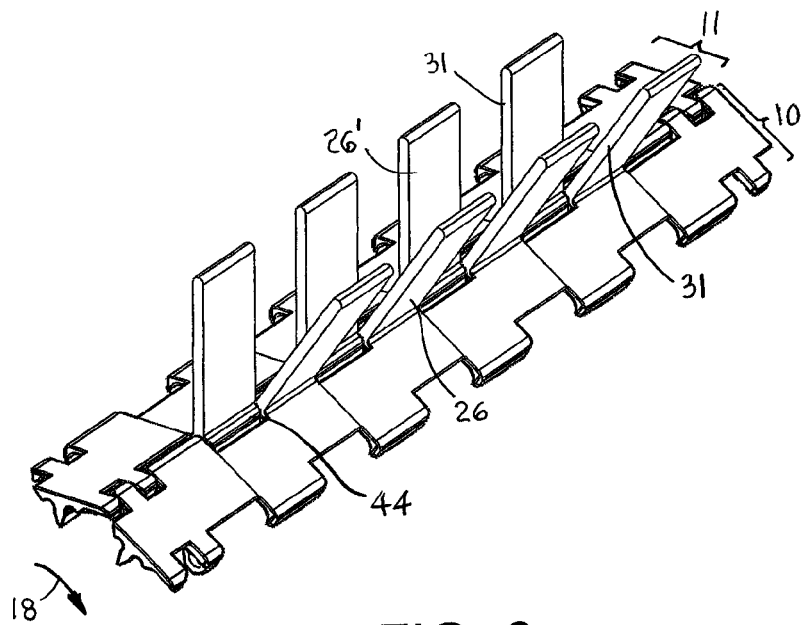
FIG. 6 is an isometric view of the two belt rows of FIG. 4 articulating about a sprocket.
Figure 7:
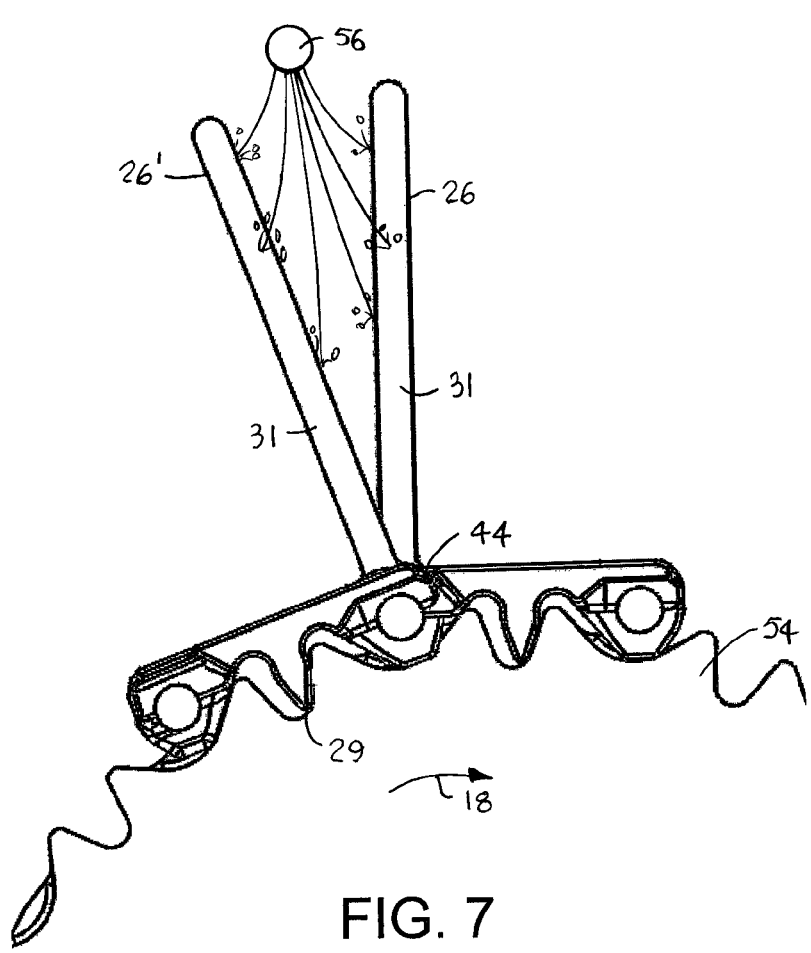
FIG. 7 is a side elevation view of the two articulating belt rows of FIG. 6.

As shown in FIGS. 6 and 7, when the belt is articulating at the hinge 44 around a sprocket 54 engaging the belt's bottom side 29, the flights 26 on the leading row 10 in the direction of belt travel are pivoted out of alignment with the flights 26' on the trailing row 11. With the flights 26, 26' opened and the normally occluded side faces 31 revealed, a cleaning system 56 can easily clean between consecutive flights 26, 26'.

Figure 8:
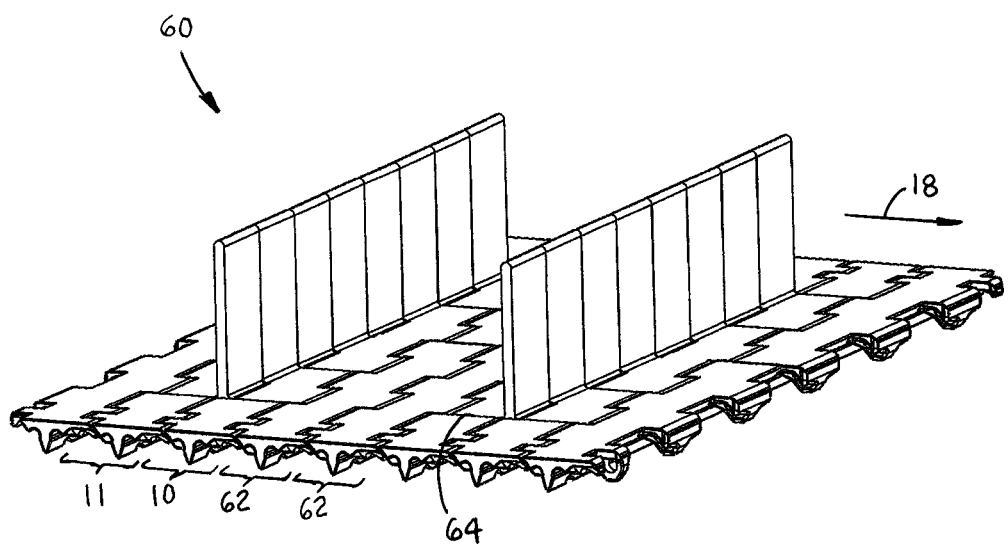
FIG. 8 is an isometric view of a portion of a modular conveyor belt constructed of flighted belt rows as in FIG. 1 and unflighted belt rows.

FIG. 8 shows a modular conveyor belt 60 constructed of pairs of flighted belt rows 10, 11 as in FIG. 4 with one or more unflighted belt rows 62 interposed between the pairs of flighted rows. The belt modules are shown in a bricklay pattern to avoid continuous inter-module seams 64 extending the full length of the belt in the direction of belt travel 18. In certain applications it might be useful to connect pairs of flighted rows 10, 11 directly in series with adjacent pairs of flighted rows.

Although the invention has been described in detail in reference to a few versions, other versions are possible. For example, the flights do not have to be flat plates perpendicular to the plane of the belt module. Scoop flights or bent flights whose upper portions curve or angle away from their lower portions are possible. If the centerlines of the lower portions are perpendicular to the plane of the belt module and intersect the pivot axes, the upper portions won't. And the two adjacent rows making up each flight would not be identical, but reversed, because the upper portions have to be formed to curve or bend in opposite directions so that, when the two rows are connected, the upper portions are aligned. Similarly, if the flights extend up at an angle from the belt module to form an oblique flight, the two adjacent rows would not be identical. In all these examples, the bases of the flights extend from hinge elements and not from the intermediate portions of the modules. As another example, the hinge elements on the leading and trailing ends of a conveyor belt module could be laterally aligned without an offset and connected end to end at the hinges with other such modules.

What is claimed is:

1. A modular conveyor belt comprising:
   a series of rows of one or more belt modules, each row extending in a direction of belt travel from a trailing end to a leading end and laterally from a left side to a right side and having a top side, wherein each row has one or more hinge elements at the trailing end and one or more hinge elements at the leading end, wherein the one or more hinge elements at the trailing end of a row are interleaved and hingedly joined with the one or more hinge elements at the leading end of an adjacent row;
   wherein at least some of the adjacent rows have flights extending upward from laterally consecutive interleaved hinge elements; and
   wherein the lateral dimension of each flight is greater than the dimension of the flight in the direction of belt travel.

2. A modular conveyor belt as in claim 1 wherein the flights on adjacent rows are in alignment when the adjacent rows are running flat and wherein the flights on adjacent rows are out of alignment when the adjacent rows are articulating.

3. A modular conveyor belt as in claim 1 wherein each flight extends upward from an individual hinge element.

4. A modular conveyor belt as in claim 1 wherein the lateral dimension of each flight equals the lateral dimension of the hinge element from which the flight extends.

5. A modular conveyor belt as in claim 1 wherein the one or more hinge elements at the leading end of each row are laterally offset from the one or more hinge elements at the trailing end of each row.

6. A conveyor belt module comprising:
   an intermediate portion extending in a direction of travel from a first end to a second end and laterally in width and having a top side;
   one or more first hinge elements extending outward from a portion of the first end of the intermediate portion and defining one or more spaces at the first end laterally adjacent to the one or more first hinge elements;
   one or more second hinge elements extending outward from a portion of the second end of the intermediate portion and defining one or more spaces at the second end laterally adjacent to the one or more second hinge elements, wherein the first hinge elements are laterally offset from the second hinge elements;
   one or more flights extending upward from the one or more first hinge elements;
   wherein each flight extends upward from an individual first hinge element without spanning any of the spaces along the first end; and
   wherein the lateral dimension of each flight is greater than the dimension of the flight in the direction of belt travel.

7. A conveyor belt module as in claim 6 wherein the lateral dimension of each flight equals the lateral dimension of the hinge element from which the flight extends.

8. A conveyor belt module as in claim 6 wherein each flight is a plate perpendicular to the plane of the conveyor belt module.

9. A conveyor belt module comprising:
   an intermediate portion extending in a direction of travel from a first end to a second end and laterally in width and having a top side;
   a plurality of first hinge elements laterally spaced apart along the first end;
   a plurality of second hinge elements laterally spaced apart along the second end, wherein the first hinge elements are laterally offset from the second hinge elements;
   a plurality of flights extending upward from the plurality of first hinge elements;
   wherein the lateral dimension of each flight is greater than the dimension of the flight in the direction of travel.

10. A modular conveyor belt as in claim 9 wherein each flight extends upward from an individual hinge element.

11. A modular conveyor belt as in claim 10 wherein the lateral dimension of each flight equals the lateral dimension of the hinge element from which the flight extends.

12. A conveyor belt as in claim 9 wherein each flight is a plate perpendicular to the plane of the conveyor belt module.

\* \* \* \* \*